United States Patent Office 3,294,741
Patented Dec. 27, 1966

3,294,741
METHOD OF MAKING POLYCARBONATE PARTICLES
Hermann Schnell, Krefeld-Urdingen, and Karl Herbert Fritsch, Krefeld, Germany, assignors to Farbenfabriken Bayer Aktiengesellschaft, Leverkusen, Germany, a German corporation
No Drawing. Filed Apr. 20, 1960, Ser. No. 23,352
Claims priority, application Germany, Apr. 25, 1959,
F 28,323
6 Claims. (Cl. 260—47)

This invention relates generally to the preparation of high molecular weight polycarbonates and, more particularly, to an improved process for preparing polycarbonates in granular form.

It has been proposed heretofore to react an organic dihydroxy compound, such as, for example, a di-(monohydroxy aryl) alkane with phosgene or a bis-chloro carbonic acid ester. Such a process is described, for example, in Canadian Patent 578,585. In accordance with that process, a di-(monohydroxy aryl) alkane dissolved in water is treated with phosgene or a bis-chlorocarbonic acid ester dissolved in a water immiscible inert organic solvent for the polycarbonate being produced. If desired, the phosgene can be dissolved in the solvent by passing gaseous phosgene into the solvent while it is dispersed in the aqueous phase. The organic solvent phase of the system is dispersed in the aqueous phase by stirring the mixture and it has been proposed to add emulsifiers or similar materials to the mixture to aid in the dispersion. As polycarbonates of high molecular weight are formed by chemical reaction between the phosgene or bis-chlorocarbonic acid ester and the di-(monohydroxy aryl) alkane, the organic solvent phase becomes very viscous and particles thereof join together to form a paste or dough which is suspended in the liquid phase. In accordance with the disclosed process, this dough is separated from the aqueous phase and is then washed with water until substantially all of the inorganic salts have been removed therefrom. It is very difficult to satisfactorily wash the inorganic salts or electrolytes from the dough and best results have been obtained heretofore by conducting the washing operation in a suitable kneading apparatus. After the washing operation in the kneader, the paste is transferred to a suitable autoclave or other apparatus where the solvent is removed therefrom by evaporation or precipitation. A process of this type requires large equipment for production of significant volumes of polycarbonate and is a costly process because of the time required to wash the polycarbonate in the kneader.

It is, therefore, an object of this invention to provide an improved method for making a polycarbonate plastic. Another object of the invention is to provide an improved method for separating a high molecular weight polycarbonate formed by reaction between a di-(monohydroxy aryl) alkane and phosgene or a bis-chlorocarbonic acid ester from the salts formed as by-products in the chemical reaction. A still further object of the invention is to provide an improved method for preparing polycarbonates of high molecular weight in a granular form adapted for use in molding operations.

The foregoing objects and others are accomplished in accordance with this invention, generally speaking, by providing a method in which globules of a polycarbonate plastic formed by reaction of a di-(monohydroxy aryl) alkane with phosgene or its equivalent and dissolved in a suitable inert organic solvent therefor maintained in suspension in a non-solvent phase until sufficient solvent has been removed from the globules to form particles of polycarbonate plastic which are insufficiently tacky to stick together or become agglomerated when they contact each other. The process of this invention can be used to advantage when preparing polycarbonates by the process described in Canadian Patent 578,585 in which the di-(monohydroxy aryl) alkane is dissolved in an alkaline aqueous phase and the resulting polycarbonate is dissolved in an inert organic solvent therefor which is immiscible with water. It has been found in accordance with this invention that solid particles of polycarbonates substantially free from electrolytes or inorganic salts and thus substantially ash-free can be made without going through the tedious and difficult step of kneading and washing a dough. Preferably, an emulsifying agent or similar material is dispersed or dissolved in the aqueous phase in order to insure that the globules formed by agitating the two-phase system will remain discrete and will not agglomerate or coalesce into a paste or doughy mass. Preferably, the organic solvent for the polycarbonate is removed by distillation but it may be removed by any other suitable process, such as, for example, by extracting it from the globules with a solvent which is miscible with the organic solvent and is a non-solvent for the polycarbonate. After the globules are no longer too tacky to prohibit quiescence, they are separated from the aqueous phase and washed with water until any electrolytes clinging thereto and any solvent remaining therein have been removed.

It is particularly advantageous to remove the solvent by distillation under vacuum at room temperature of about 20° C. or at temperatures slightly above room temperature or by heating the system to the boiling point at atmospheric pressure in order to evaporate the solvent from the globules. Stirring of the system must be maintained at a point where the globules remain suspended in the aqueous phase until sufficient solvent has been removed that the particles can touch each other without becoming stuck together. At this point, the particles can be separated from the aqueous phase by filtration or any other suitable process. The particles or spheres of polycarbonate resin separated from the aqueous phase may still be considerably swollen from the presence of solvent. These particles are washed with water, and preferably with distilled water, until the pH of the water leaving the polycarbonates is about 7. Alternate hot and cold water washings are preferred to insure removal of all of the chlorides from the polycarbonates. The amount of water required will vary from batch to batch but ordinarily a volume of water of from about 10 to about 15 times the volume of polycarbonate will be sufficient to reduce the ash content of the polycarbonate to less than about 0.5 percent.

Any solvent remaining in the polycarbonate particles after the washing operation has been concluded can be removed by boiling the polycarbonate in water or by placing the polycarbonate in a suitable hot air dryer.

For best results, the two-phase system should be provided with a suitable dispersion adjuvant to insure proper dispersion of the polycarbonate-solvent globules in the aqueous phase. For this purpose, there may be used, for example ionogenic or non-ionogenic emulsifiers which are active in alkaline media and which contain hydrophilic and hydrophobic groups in the molecule, such as alkyl, aryl or alkaryl sulfonic acids or their salts, for example, the neutralized sulfochlorination product of a $C_{14}$–$C_{15}$ paraffin-hydrocarbon mixture (average boiling point 270° C.), sodium benzyl-diphenyl sulfonate or sodium dibutyl-naphthalene sulfonate, as well as the sulfuric acid esters of alcohols, such as lauryl sulfate and oleyl sulfate, the sulfuric acid esters of the hydroxy compounds obtained from phenols, alcohols or carboxylic acids by reaction with different amounts of alkylene oxides, such as ethylene oxide, propylene oxide and styrene oxide, examples of such esters being oleic acid-hydroxy ethane sulfonate or sulfonated alkyl-phenyl polyglycol ethers.

Emulsifiers which contain 3- or 5-valent phosphorus, such as tetradecane-1-phosphinate, are also suitable.

As well as the anionic emulsifiers, the cationic emulsifiers, such as benzyl-dimethyl-lauryl-ammonium chloride, may also be used, as well as the reaction products of phenols, alcohols and carboxylic acids and their derivatives with alkylene oxides, such as ethylene oxide, propylene oxide or styrene oxide, for example, the reaction product of 6 mols ethylene oxide with 1 mol methylol-Tetraline or the reaction product of oleyl alcohol with 20 mols ethylene oxide.

The ratio of the hydrophobic to the hydrophilic constituents in the last-mentioned products, which is determined by the nature of the alkylene oxide and the nature and amount of the phenols, alcohols and carboxylic acids used, is preferably so chosen that the compounds are at least partially soluble in water. Mixtures of the above-described surface-active compounds can frequently be used with advantage.

Dispersion adjuvants within the scope of the invention are also, for example, inorganic compounds in finely-divided form, such as calcium oxide, calcium phosphate, calcium oxalate, calcium carbonate, magnesium hydroxide, aluminium hydroxide, silicon dioxide, titanium dioxide, barium sulfate, silicates, bentonite and talc. Of these compounds, it is particularly advantageous to employ those which are soluble in acids, such as calcium oxide, calcium phosphate, and calcium oxalate, since they are easily dissolved by acidification.

Furthermore, protective colloids can also be used, such as tragacanth, gum arabic, starch, gelatine, polyacrylic acid, polyethylene oxide, carboxymethyl cellulose, polyvinyl alcohol and the like. The water-soluble phenol-formaldehyde condensation products, such as the condensation product from cresol, 2-naphthol-6-sulfonic acid and formaldehyde, also have a dispersing effect.

All these types of compounds can, if desired, be mixed with one another in almost any desired ratio in order to achieve the desired effect. The suitable emulsifiers and/or dispersion adjuvants suitable for a definite system can easily be determined by simple experiments. In many cases, the desired effect can be achieved with small amounts of suspension adjuvants if neutral salts, such as sodium chloride, are added thereto. Furthermore, it is also advantageous to use concurrently soaps, such as Marseilles soaps, in combination with an emulsifier. It is apparent that a large variety of emulsifiers or dispersing agents can be used and that all such materials which are chemically inert to the polycarbonate resin are contemplated.

The size and form of the suspended particles resulting from the polycarbonate solution are dependent upon the nature and amount of the emulsifier and/or what dispersion adjuvants used, on the effectiveness of the stirring, on the shape of the reaction vessel and on the reaction temperature. In almost all cases, the usual stirring devices are sufficient. The usually somewhat spherical-shaped polycarbonate particles have, as a rule, a diameter of about 10 microns to about 2000 microns, preferably about 20 microns to about 700 microns. Thus, it is also possible to choose the size of the polycarbonate particles corresponding to the subsequent working-up. According to the present invention, it is possible, for example, to produce polycarbonates with a bulk density lying preferably between about 0.50 and about 0.7.

The process according to the invention has the further advantage that the polycarbonates are obtained in a form which is particularly suitable for all types of subsequent working-up, so that confectioning, for example, for a particular production of granulate, can be omitted. The products are granular, friable, or flowing masses which can easily be dosed, filled and transported. They form fluidized beds. In the same manner, they can also be worked up according to the sinter-press process. They are eminently suitable for all thermoplastic working-up processes, are easily meltable and dissolve without difficulty in solvents.

As examples of starting compounds for the production of polycarbonates, there may be mentioned (4,4'-dihydroxy-diphenyl)-methane,
2,2-(4,4'-dihydroxy-diphenyl)-propane,
1,1-(4,4'-dihydroxy-diphenyl)-cyclohexane,
1,1-(4,4'-dihydroxy-diphenyl)-hexane,
1,1-(4,4'-dihydroxy-diphenyl)-1-phenyl-ethane,
2,2-(4,4'-dihydroxy-diphenyl)-butane,
2,2-(4,4'-dihydroxy-diphenyl)-pentane,
3,3-(4,4'-dihydroxy-diphenyl)-pentane,
2,2-(4,4'-dihydroxy-diphenyl)-3-methyl butane,
2,2-(4,4'-dihydroxy-diphenyl)-hexane,
2,2-(4,4'-dihydroxy-diphenyl)-heptane,
4,4-(4,4'-dihydroxy-diphenyl)-heptane and
2,2-(4,4'-dihydroxy-diphenyl)-tridecane.

Further examples of dihydroxy compounds are 4,4'-dihydroxy - diphenyl ether, 4,4' - dihydroxy - diphenyl sulfide, 4,4'-dihydroxy-diphenyl sulphone and 4,4'-dihydroxy-diphenyl-sulfoxide, as well as those which are substituted one or more times on the aromatic nuclei by halogen atoms, alkoxy, alkyl or acyl radicals, such as 2,2-(4,4'-dihydroxy-3,3'-dimethyl-diphenyl)-propane, 2,2-(4,4'-dihydroxy-3, 3' - dimethoxy - diphenyl) - propane, 2,2 - (4,4' - dihydroxy - 3,3',5,5' - tetrachloro - diphenyl) - propane and (4,4' - dihydroxy - 3,3' - dimethyl - 5,5' - dichlorodiphenyl)-methane.

These compounds can be converted into high molecular weight polycarbonates alone or mixed with one another and/or in admixture with other dihydroxy compounds, such as ethylene glycol, di-, tri- or polyethylene glycol, thiodiglycol, ethylene dithiodiglycol, propane-1,2-diol and di- and polyglycols from propylene-1,2-oxide, as well as propane-1,3-diol, butane-1,3-diol, butane-1,4-diol, 2-methylpropane-1,3-diol, hexane-1,6-diol, octane-1,8-diol, 2-ethylhexane-1,3-diol, decane-1,10-diol, chinite, cyclohexane-1,2-diol, o-, m- and p-xylylene glycol, 2,2-(4,4'-dihydroxy - dicyclohexyl) - propane, 2,6 - dihydroxy-decahydronaphthalene, hydroquinone, resorcinol, pyrocatechol, 4,4'-dihydroxydiphenyl-2,2'-dihydroxydiphenyl, 1,4 - dihydroxy - naphthalene, 1,6 - dihydroxynapthalene, 2,6 - dihydroxynaphthalene, 1,2-dihydroxynaphthalene, 1, 5 - dihydroxyanthracene, 5,8 - dihydroxy - quinoline, 2,2'-dihydroxyl - 1,1' - naphthyl and o-, m- and p-hydroxybenzyl alcohol, by reaction with phosgene or with the bis-chloroformic acid esters of these dihydroxy compounds.

Any suitable inert solvent for the polycarbonate may be used, such as, for example, methylene chloride, ethylene chloride, trichloroethylene, carbon tetrachloride, benzene, xylene, toluene, cyclohexanone, anisole, chlorobenzene and the like. Since the solubility of the polycarbonates is dependent upon their constitution, the inert solvent suitable for a definite polycarbonate must be ascertained by a simple dissolving test.

In one embodiment, the dihydroxy compounds, or a mixture of dihydroxy compounds, is dissolved or suspended in the aqueous lye and, after the addition of the inert solvent, phosgene or a phosgene solution is introduced, with stirring, in the same amount that it is used up at a temperature of between about 0° C. and 40° C., preferably between about 10° C. and 20° C., with removal of the heat of reaction. If, instead of phosgene, a bis-chlorocarbonic acid ester of a dihydroxy compound is used, then this is dissolved completely or at least partially in the inert solvent or introduced into the reaction mixture without the use of a solvent. The quality of the aqueous lye is such that an alkaline reaction remains until the end of the reaction. The aqueous phase should preferably amount to about 1 to 8 times and most preferably about 4 to 6 times the amount by weight of the dihydroxy compound. The amount of the inert solvent is preferably so chosen that preferably approximately 5 percent to about 70 percent and most preferably approximately 30 percent to about 60 percent, polycarbonate solution results.

As is usual in the production of polycarbonates, in this case too, the molecular weight can be adjusted by means of chain breakers and the reaction can be catalytically accelerated by the addition of tertiary amines or quaternary ammonium compounds. In the case of the phosgenization process, it is advantageous to add the catalyst at the end of the phosgenization.

Some time after the addition of the catalyst, in the case where the catalyst is used, the polycarbonate achieves the adjusted molecular weight.

The emulsifiers and/or the dispersion adjuvants can be added at the beginning or also gradually, for example, portionwise, during the reaction to the reaction mixture. In the case of the phosgenization process, it is advantageous to add these adjuvants after the phosgenization at about the same time as the addition of the catalyst. The amount of emulsifier and/or dispersion adjuvant depends particularly on the nature of these adjuvants. The ionogenic and non-ionogenic emulsifiers are used, for example, preferably in amounts of about 0.1 to about 24 percent, and most preferably about 1 percent to about 12 percent, based on the weight of a dihydroxy compound or mixture of dihydroxy compounds introduced. The inorganic dispersion adjuvants are used preferably in amounts of about 0.1 percent to about 8 percent and most preferably about 1 percent to about 6 percent, based on the weight of a dihydroxy compound. The natural and synthetic materials which act as protective colloids or dispersion adjuvants are used preferably in amounts of, for example, about 1 percent to about 10 percent and most preferably about 2 percent to about 30 percent, based on the weight of di-(hydroxy aryl) alkane or similar dihydroxy compounds.

As already mentioned, the most suitable suspension adjuvants can be determined by simple experiments and can be co-ordinated, for example, with the speed of stirring, the reaction temperature, the amount of the aqueous and organic phase, i.e., with the reaction conditions which influence the formation of the suspension.

Even during the production of the polycarbonates, if desired, modifying agents, such as plasticizers, dyestuffs, filling materials and agents rendering more easy the removal of formed bodies from molds, can be worked in. Chemical reactions, such as the reaction of the phenolic end groups present with alkylation or acylation agents or the conversion of the phenolic end groups present as sodium salts into the hydroxy form with acids, can be carried out in the more or less concentrated polycarbonate solutions in the suspensions. By means of such subsequent treatments, polycarbonates can frequently be obtained with still smaller ash content.

It is often advantageous to carry out the production of the polycarbonates by the process according to the invention in an inert gaseous atmosphere, for example, nitrogen, and in the presence of reducing compounds, such as sodium sulfite. The reducing compounds, such as tetradecane-1-phosphinate, can also have a second function, such as that of an emulsifying agent.

The reactions described in the following examples are carried out in a cylindrical two liter vessel made from Jena glass. A propeller stirrer can be used as an agitator. The speed of stirring amounts to 1000 r.p.m. unless otherwise specified. Two metal strips about 1 centimeter wide serve as wave breakers or baffles.

The following examples are given for the purpose of illustrating the present invention:

Example 1

About 137 grams 2,2-(4,4'-dihydroxy-diphenyl)-propane and about 2.5 grams p-tertiary-butyl phenol are dissolved in about 750 grams distilled water and about 156 grams of a 45 percent aqueous sodium hydroxide solution, admixed with about 1 gram sodium sulfite and about 230 grams methylene chloride and phosgenated with stirring and cooling at about 20° C. with about 72 grams phosgene in about 50 minutes. Subsequently, about 4.2 grams of the sodium salt of a sulfonated $C_{14}$–$C_{15}$ paraffin hydrocarbon mixture and about 0.14 gram Marseilles soap dissolved in about 50 grams distilled water are added, together with about 0.2 gram triethylamine. About 1 hour afterwards, the methylene chloride is distilled off with stirring and under reduced pressure at least until the suspended polycarbonate particles can be filtered off from the mother liquor without agglomerating. This is possible when a test quantity of the polycarbonate can no longer be kneaded together with the finger. The polycarbonate formed is separated from the mother liquor in a suction filter funnel, washed neutral and substantially chlorine-free with about 1000 grams distilled water in about 200 gram portions, and subsequently boiled for half an hour with about 200 gram amounts of distilled water until the filtrate shows no chloride ions when tested with silver nitrate. As a rule, this is the case after use of about 400 to about 800 grams water. The polycarbonate is obtained in the form of spheroids, the statistical diameters of which lie between about 70 to about 140 microns.

The relative viscosity in methylene chloride is 1.307, the ash content is 0.038 to 0.042 percent and the average value notch impact strength is 18.1 cm. kg./cm.$^2$.

Example 2

When, in Example 1, the stirrer rotates at only 200 to 300 r.p.m. instead of 1000 r.p.m., then a polycarbonate is also obtained in the form of spheroids which are, however, more irregularly formed and which have statistical diameters lying between about 150 and 350 microns.

Relative viscosity in methylene chloride is 1.314 and the ash content as 0.039 to 0.045 percent.

Example 3

When in Example 1, only about 1.4 grams of the emulsifier mentioned are used, together with about 30 grams sodium chloride, then the polycarbonate is also obtained in the form of spheroids, the statistical diameters of which lie between 100 and 350 microns.

The realtive viscosity in methylene chloride is 1.299 and the ash content is 0.033 percent to 0.037 percent.

Example 4

When the polycarbonate is made according to the process described in Example 1 except that it is acidified after removal of the mother liquor with hydrochloric acid and stirring is continued for about one-half hour, then, after working up, the polycarbonate is obtained in the form of particles with a diameter of about 70 to about 140 microns, the ash content of which amounts to 0.019 to 0.020 percent.

Example 5

When, in Example 1, about 0.04 gram Siegle-achtblau BSN are also added, then, after the thermoplastic working-up of the polycarbonate, a homogeneous colored polycarbonate is obtained.

Example 6

About 124 grams 2,2-(4,4'-dihydroxy-diphenyl)-propane are dissolved with about 16 grams 1,1-(4,4'-dihydroxy-diphenyl)-cyclohexane in about 750 grams distilled water and about 168 grams 45 percent aqueous sodium hydroxide solution, together with 2.2 grams p-tertiary-butyl phenol, admixed with about 200 grams methylene chloride and phosgenated with about 70 grams phosgene in about 50 minutes with stirring and cooling. The reaction is terminated as in Example 1 and the polycarbonate worked up. The statistical diameter of the polycarbonate spheroids is about 70 to about 140 microns. Relative viscosity in methylene chloride is 1.372.

Example 7

About 137 grams 2,2-(4,4'-dihydroxy-diphenyl)-propane and about 2.2 grams p-tertiary-butyl phenol are mixed with about 400 grams distilled water, about 156 grams 45 percent aqueous sodium hydroxide solution and about 220 grams methylene chloride and phosgenated at about 20° C., with stirring and cooling, with about 70 grams phosgene in about 50 minutes. Subsequently, a suspension of about 80 grams finely-divided calcium hydride in about 100 grams distilled water, as well as about 0.24 gram triethylamine, is added thereto. About one hour afterwards, the methylene chloride is distilled off with stirring at reduced pressure at about 25° C., the mother liquor is filtered off from the solid constituents of the reaction mixture and the residue suspended in about 500 grams water and acidified with hydrochloric acid. Subsequently, the polycarbonate is washed neutral as in Example 1 and further worked up. The polycarbonate is obtained in the form of spheroids with a diameter of about 200 to about 500 microns.

The relative viscosity in methylene chloride is 1.333 and the impact strength of a 47 to 52 micron thick film is 790 cm. kg./cm.$^3$.

Example 8

About 137 grams 2,2-(4,4'-dihydroxy-diphenyl)-propane are dissolved with about 2.2 grams p-tertiary-butyl phenol in about 750 grams distilled water, about 180 grams 45 percent aqueous sodium hydroxide solution and about 230 grams methylene chloride and phosgenated in about 55 minutes with about 70 grams phosgene, with stirring and cooling at about 20° C. Subsequently, about 0.24 gram triethylamine and about 7 grams carboxymethyl cellulose dissolved in about 150 grams water are added thereto. The material is further worked up in the manner described in Example 1. A polycarbonate is obtained in the form of spheroids, the statistical diameter of which lies between 40 microns and 100 microns.

The relative viscosity in methylene chloride is 1.332 and the ash content is 0.031 percent.

Example 9

When, in Example 1, instead of the carboxymethyl cellulose, a mixture of about 4.2 grams of a dispersing adjuvant (condensation product of cresol 2-naphthol-6-sulfonic acid and formaldehyde) and about 1.4 grams of the sodium salt of a sulfonated $C_{14}$–$C_{15}$ paraffin hydrocarbon mixture dissolved in about 50 grams water is added, then, after working-up as described in Example 1, the polycarbonate is obtained in the form of spheroids with a diameter of about 140 microns to about 700 microns.

Example 10

When, in Example 8, instead of the carboxymethyl cellulose, a mixture of about 2.5 grams of a sodium salt of a sulfonated $C_{14}$–$C_{15}$ paraffin hydrocarbon mixture and about 1.7 grams of an emulsifier obtained from oleyl alcohol and about 20 mols ethylene oxide is used, then a polycarbonate is obtained in the form of spheroids with a diameter of about 200 to 500 microns.

Example 11

If, in Example 8, instead of carboxymethyl cellulose, a mixture of about 16.8 grams neutral triethylamine oleate and about 1.4 grams of the sodium salt of a sulfonated $C_{14}$–$C_{15}$ paraffin hydrocarbon mixture is used, then the polycarbonate is obtained as spheroids with a diameter of about 280 to about 420 microns.

Example 12

About 2 grams magnesium hydroxide are precipitated in about 600 grams distilled water by the introduction, with good stirring, into a magnesium chloride solution of the equivalent amount of sodium hydroxide solution. Subsequently, about 156 grams 45 percent aqueous sodium hydroxide solution, about 137 grams 2,2-(4,4'-dihydroxy-diphenyl)-propane, about 220 grams methylene chloride, about 2 grams tertiary-butyl phenol and about 30 grams sodium chloride are added thereto. This is phosgenated as in Example 1, admixed with about 0.24 gram triethylamine as a catalyst and further worked up. After the mother liquor has been separated from the polycarbonate, the polycarbonate is suspended in about 200 millimeters water, acidified with hydrochloric acid, stirred for about half an hour and then further washed in the manner described in Example 1. The polycarbonate is thus obtained in the form of spheroids, the statistical diameter of which lies between 30 microns and 140 microns.

Example 13

About 79.0 grams hexane-1,6-diol-bis-chlorocarbonic acid ester are dissolved in about 100 grams methylene chloride and added dropwise at about 21° C. to about 24° C. to a solution of about 40 grams 1,1-(4,4'-dihydroxy-diphenyl)-cyclohexane and about 34.5 grams 2,2-(4,4'-hydroxy-diphenyl)-propane in about 800 grams distilled water, about 100 grams methylene chloride and about 318 grams sodium hydroxide, with stirring, in about 50 minutes. Subsequently, about 4 grams of the sodium salt of a sulfonated $C_{14}$–$C_{15}$ paraffin hydrocarbon mixture and about 200 milligrams triethylamine dissolved in a small amount of water are added thereto. The material is worked up as in Example 1. The polycarbonate is obtained as spheroids with a diameter of about 70 microns to about 300 microns.

The relative viscosity in methylene chloride is about 1.340.

Example 14

The polycarbonate is produced in the manner described in Example 1. In this case, however, about 4.2 grams lauryl sulfate are used as emulsifier.

At the end of the reaction, the methylene chloride is not distilled off and the particles thereby stabilized but the particles are solidified by the addition of 150 grams of a non-water-miscible non-solvent for polycarbonates, such as ligroin.

The polycarbonate, after isolation and washing twice with about 200 grams distilled water, is heated with about 200 grams distilled water and about 5 millimeters concentrated hydrochloric acid, phosphoric acid or sulfuric acid for about 3 hours at about 90° C. in order not only to dissolve the inorganic impurities, such as sodium chloride, but also to saponify the alkyl sulfate. Subsequently, it is washed with about 200 millimeter quantities of distilled water until the filtrate is no longer cloudy upon the addition of silver ions. The polycarbonate is obtained in the form of particles of about 200 microns.

The relative viscosity in methylene chloride amounts to about 1.320.

It is to be understood that variations can be made in the foregoing examples, such as, for example, by preparing the polycarbonate from other reactants indicated as suitable herein. The various chemical reactants, emulsifying agents and modifying agents listed herein are only examples of the types of materials that can be used and the invention broadly contemplates all types of these materials.

The polycarbonates provided by this invention can be used for molding various types of articles, such as, for example, mining helmets, for coatings or the like.

In addition to the disclosure given above there still may be mentioned that suitable chain breakers for the production of the polycarbonates according to the invention are especially monophenols such as the phenol, the cresols and p-tertiary-butyl phenol.

With regard to ionogenic and non-ionogenic emulsifiers there may be referred to "Emulsions, Theory and Praxis" by Paul Becher, Reinhold Verlag, New York, 1957, page 166.

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claims.

What is claimed is:

1. A method for making a polycarbonate resin in particulate form which comprises in one step reacting a di-(monohydroxy aryl) alkane with a member selected from the group consisting of phosgene and a chlorocarbonic acid ester in a two-phase system with the di-(monohydroxy aryl) alkane in an alkaline aqueous phase and the resulting polycarbonate in an inert organic solvent therefor, said polycarbonate solution being substantially immiscible with said aqueous phase, agitating the two-phase system to suspend globules of the polycarbonate solution in the aqueous phase while simultaneously removing the solvent from the globules to form particles of polycarbonate having a diameter of from about 10 microns to about 2,000 microns.

2. The process of claim 1 wherein said solvent is removed from the globules by distillation.

3. The process of claim 1 wherein the solvent is methylene chloride.

4. The process of claim 1 wherein the polycarbonate is prepared in the presence of catalysts, chain breakers and reducing agents.

5. The process of claim 1 wherein the solvent is removed from the globules by dissolving it in a solvent therefor which is a non-solvent for the polycarbonate.

6. A method for making particles of a polycarbonate resin which comprises in one step reacting a di-(monohydroxy aryl) alkane with a member selected from the group consisting of phosgene and a chlorocarbonic acid ester in a two-phase system with a di(monohydroxy aryl) alkane in an alkaline aqueous phase and the resulting polycarbonate in an inert organic solvent therefor, said polycarbonate solution being substantially immiscible with said aqueous phase, agitating the two-phase system to suspend globules of the polycarbonate solution in the aqueous phase while simultaneously heating to distill off the solvent from the globules to form particles of polycarbonate.

References Cited by the Examiner

UNITED STATES PATENTS

| 2,989,503 | 6/1961 | Jibben | 260—47 |
| 3,143,525 | 8/1964 | Ott | 260—47 |

FOREIGN PATENTS

| 205,746 | 10/1959 | Austria. |
| 772,627 | 4/1957 | Great Britain. |

JOSEPH L. SCHOFER, *Primary Examiner.*

HAROLD BURSTEIN, LEON J. BERCOVITZ, JAMES A. SEIDLECK, *Examiners.*

J. T. BROWN, *Assistant Examiner.*